(12) United States Patent
Huang

(10) Patent No.: US 8,066,502 B2
(45) Date of Patent: Nov. 29, 2011

(54) MOLDING MATERIAL FEEDING BARREL AND MOLDING MATERIAL FEEDING SYSTEM

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 19 days.

(21) Appl. No.: 12/644,650

(22) Filed: Dec. 22, 2009

(65) Prior Publication Data

US 2010/0159055 A1 Jun. 24, 2010

(30) Foreign Application Priority Data

Dec. 24, 2008 (CN) .......................... 2008 1 0306503

(51) Int. Cl.
*B29C 45/80* (2006.01)

(52) U.S. Cl. ......... 425/145; 425/147; 425/169; 425/173

(58) Field of Classification Search .................. 425/145, 425/147, 169, 173
See application file for complete search history.

(56) References Cited

U.S. PATENT DOCUMENTS

| 3,128,502 A | * | 4/1964 | Johnson, Jr. et al. | ......... 425/550 |
| 5,646,596 A | * | 7/1997 | Gumm | ....................... 340/573.1 |
| 5,772,319 A | * | 6/1998 | Pemberton et al. | .......... 366/76.2 |
| 2008/0258343 A1 | * | 10/2008 | Tado et al. | .................... 264/338 |

* cited by examiner

*Primary Examiner* — Timothy Heitbrink
(74) *Attorney, Agent, or Firm* — Altis Law Group, Inc.

(57) ABSTRACT

An exemplary molding material feeding barrel includes a main body, a blocking member, and an electrically conductive member. The main body has a chamber defined therein. The main body has a first inner surface in the chamber. The blocking member protrudes inward from the first inner surface of the main body. The electrically conductive member has a first end exposed at an inside of the main body, and a second end grounded.

18 Claims, 6 Drawing Sheets

MOLDING MATERIAL FEEDING BARREL AND MOLDING MATERIAL FEEDING SYSTEM

BACKGROUND

1. Technical Field

The present disclosure relates to a molding material feeding barrel and, particularly, to a molding material feeding barrel for an injection molding apparatus and a molding material feeding system having such molding material feeding barrel.

2. Description of Related Art

Injection molding apparatuses are widely used for manufacturing optical articles, such as light guide plates, lenses, and so on. Generally, an injection molding apparatus includes a molding material feeding system, a melting device, and a mold injection device. Plastic materials are guided to the melting device via the molding material feeding system. The plastic materials are melted and then injected into the injection mold device.

The molding material feeding system typically includes a hopper and a molding material feeding barrel in communication with the hopper. The molding material feeding system is vertically arranged. Molding materials are loaded in the hopper, then flows through the molding material feeding barrel into the melting device. In mass production, the molding material must be loaded in the molding material feeding system time repeatedly to maintain a constant flow of material. The level of the molding material in the molding material feeding barrel should be above a certain level at all times to avoid interruption of the molding materials to the injection mold device.

Typically, a level of the top of the molding materials in the molding material feeding barrel is detected by a sensor installed in the mold feeding barrel. However, static electricity causes material remnants to stick to the inner wall of the mold feeding barrel. As a result the sensor cannot accurately detect the actual material level in the mold feeding barrel. Thus, error conclusions may always be drawn.

Therefore, a molding material feeding barrel and a molding material feeding system using the same which can overcome the above mentioned problems are desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Various embodiments will now be described in detail below with reference to the drawings.

Figure 1:
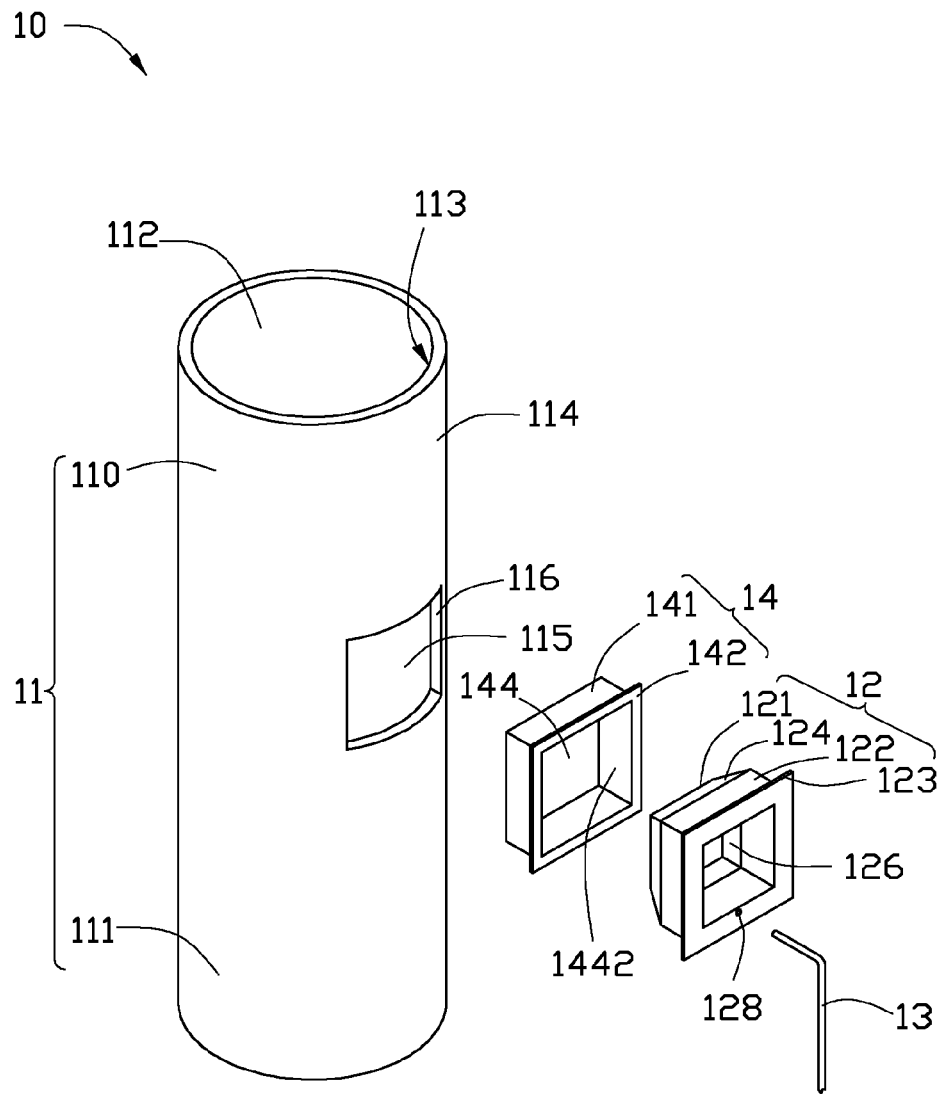
FIG. 1 is an exploded, isometric view of a first exemplary embodiment of a mold feeding barrel.
Figure 2:
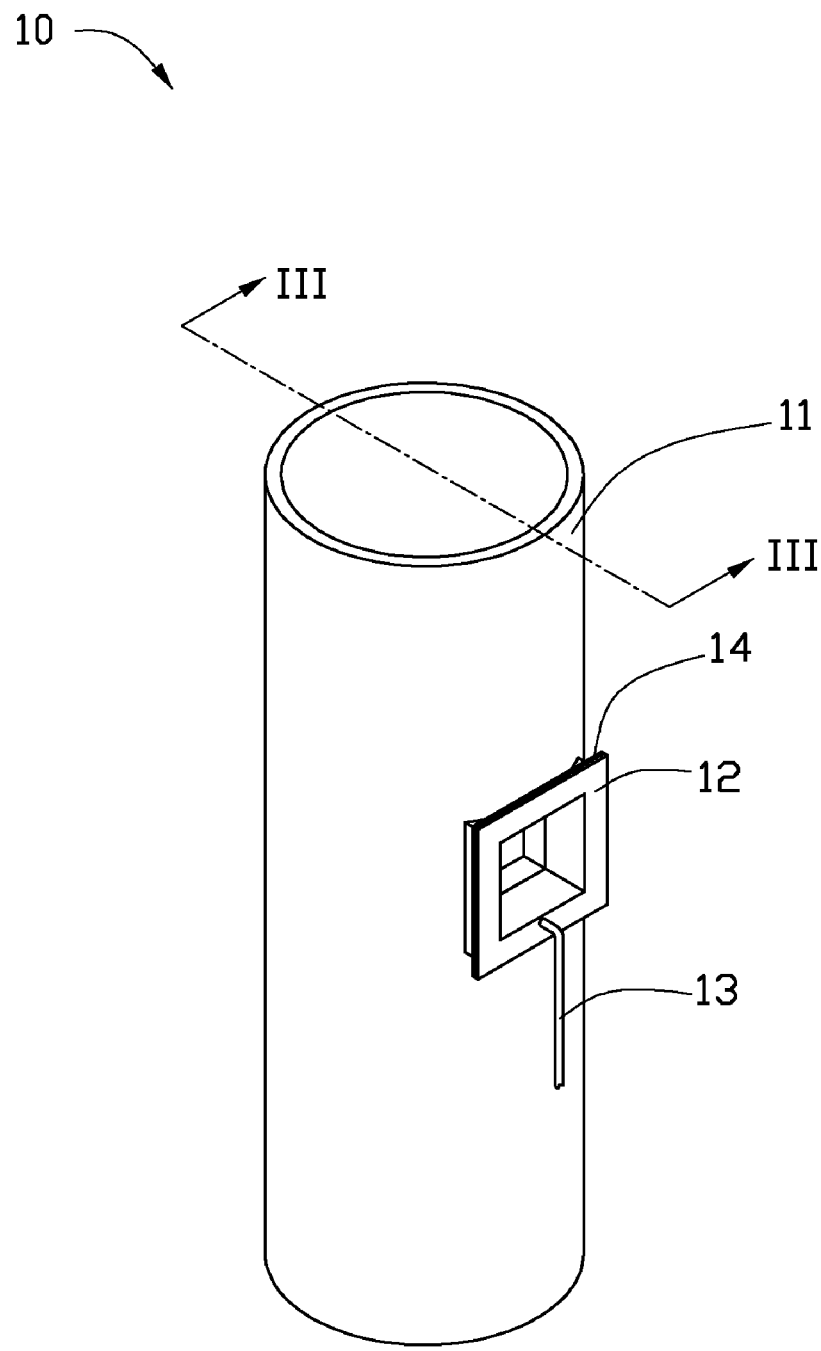
FIG. 2 is an assembled, isometric view of the molding material feeding barrel of FIG. 1.
Figure 3:
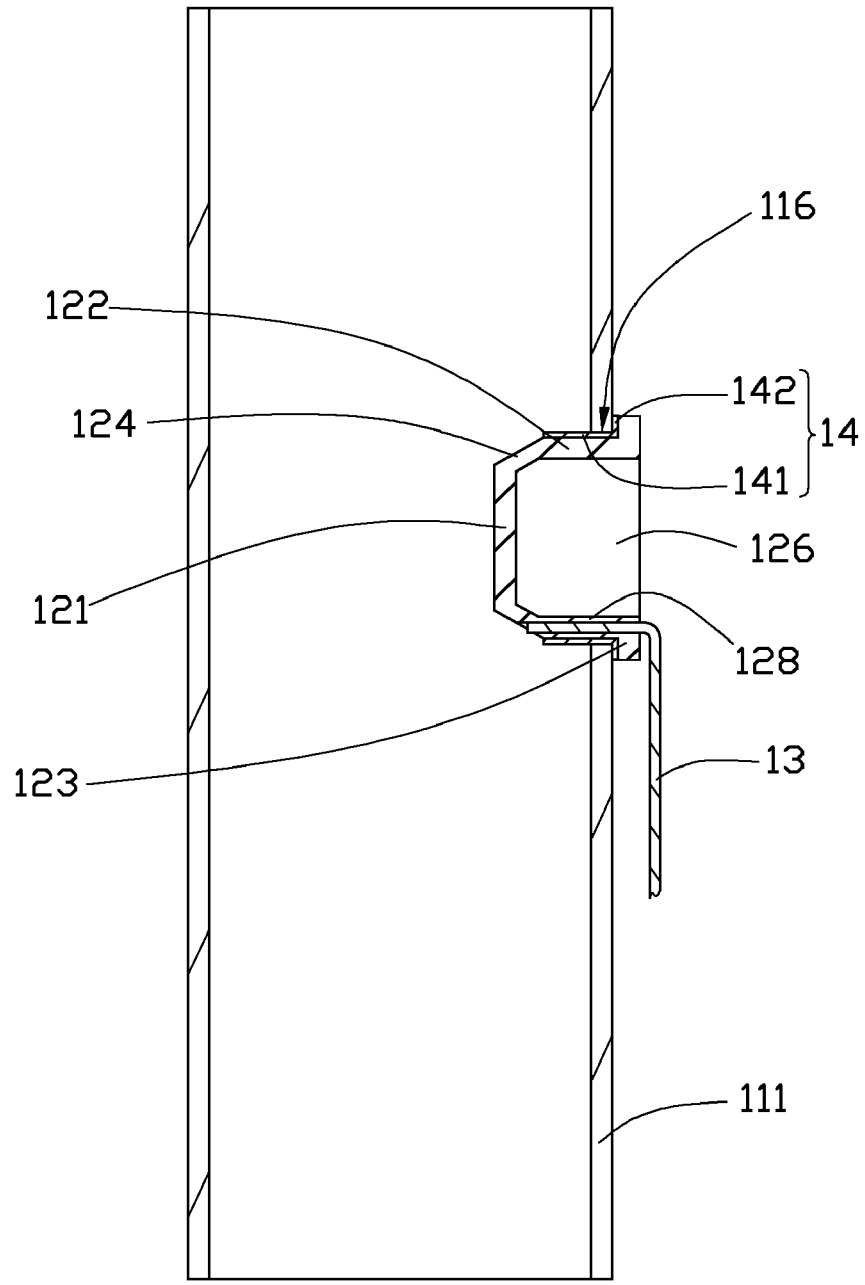
FIG. 3 is a sectional view taken along line III-III of FIG. 2.

Referring to FIGS. 1-3, a molding material feeding barrel 10 according to a first embodiment is shown. The molding material feeding barrel 10 is configured for guiding molding material to a melting device. The molding material feeding barrel 10 includes a main body 11, a blocking member 12, an electrically conductive member 13, and an airtight seal 14.

The main body 11 has a chamber 112 defined therein. In the present embodiment, the main body 11 is hollow and cylindrical. It can be understood that the shape of main body 11 can also be a hollow prism, not limited to the present embodiment. The main body 11 includes a top end 110, and a bottom end 111. The top end 110 is configured to be connected with a hopper, thus molding material can be fed to the main body 11 via the hopper. The bottom end 111 is configured to be connected a melting device (not shown). The main body 11 has an inner surface 113 in the chamber 112 and an outer surface 114. A fixing hole 115 is defined through a sidewall thereof. The fixing hole 115 is positioned at a predetermined height of the main body 11. In use, when the molding material level in the chamber 112 falls below the fixing hole 115, more molding material should be introduced into the molding material feeding barrel 10. The main body 11 includes an inner surface 116 adjacent/around the fixing hole 115. In the present embodiment, the fixing hole 115 has a rectangular cross-section.

The airtight seal 14 includes a seal main body 141 and a flange/rim 142. The seal main body 141 has a looped shape with a rectangular cross-section. The flange/rim 142 is rectangular and defines a rectangular hole 144. The cross-section of the rectangular hole 144 conforms to the cross-section of the seal main body 141. The rectangular hole is aligned with seal main body 141. That is, the bottom plate 142 includes four sides connected end to end. The seal main body 141 and the flange/rim 142 are fixed to each other. In this embodiment, the seal main body 141 is integrally formed with the flange/rim 142. The airtight seal 14 has an inner surface 1442. The seal main body 141 of the airtight seal 14 is sealed to the inner wall 116 of the fixing hole 115 in an airtight manner. The flange/rim 142 of the airtight seal 14 hermetically contacts the outer surface 114 of the main body 11 of the molding material feeding barrel 10.

The blocking member 12 is configured for preventing the molding material remnants from depositing on the inner surface 113 of the main body 11 due to static electricity. The blocking member 12 includes a top plate 121, a connection plate 124, a side plate 122, and a bottom plate 123 connecting with one another in the above order. The connection plate 124 includes four sides connected end to end, forming a loop. The four sides of the connection plate 124 all are inclined to the top plate 121, and taper from the side plate 122 to the top plate 121. The side plate 122 includes four sides connected end to end, forming a looped shape. The four sides of the side plate 122 are connected with distal ends of the four sides of the connection plate 124, respectively, and are substantially perpendicular to the top plate 121. The bottom plate 123 is rectangular. The bottom plate 123 has a hole with a rectangular cross-section. The rectangular cross-sectional hole of the bottom plate 123 conforms to the cross-section of the side plate 122. The rectangular cross-sectional hole of the bottom plate 123 is aligned with the side plate 122. A blind hole 126 is defined in the bottom plate 123. The blocking member 12 is arranged through the airtight seal 14. The side plate 122 hermetically contacts the inner surface 1442 of the airtight seal 14. The bottom plate 123 hermetically contacts the flange/rim 142 of the airtight seal 14. The top plate 121 of the blocking member 12 faces the inner surface 113 of the main body 11. In the present embodiment, a distance between the top plate 121 and the bottom plate 123 is in a range from about /1;3 to about /1;5 of the diameter of the main body 11. The blocking member 12 is light-pervious such that the inside of the chamber 112 can be viewed through the blocking member 12. In the present embodiment, the blocking member 12 is comprised of glass.

A thin, elongated through hole 128 is defined through the side plate 122, the bottom plate 123, and the connection plate 124 of the blocking member 12. The electrically conductive member 13 is partly inserted in the through hole 128. One end of the electrically conductive member 13 is received in the chamber 112 of the main body 11, and the other end of the electrically conductive member 13 is grounded. The electrically conductive member 13 is configured to contact the molding material in the chamber 112 such that static electricity of the material is conducted to ground. In the present embodiment, the electrically conductive member 13 is a conducting wire.

Figure 4:
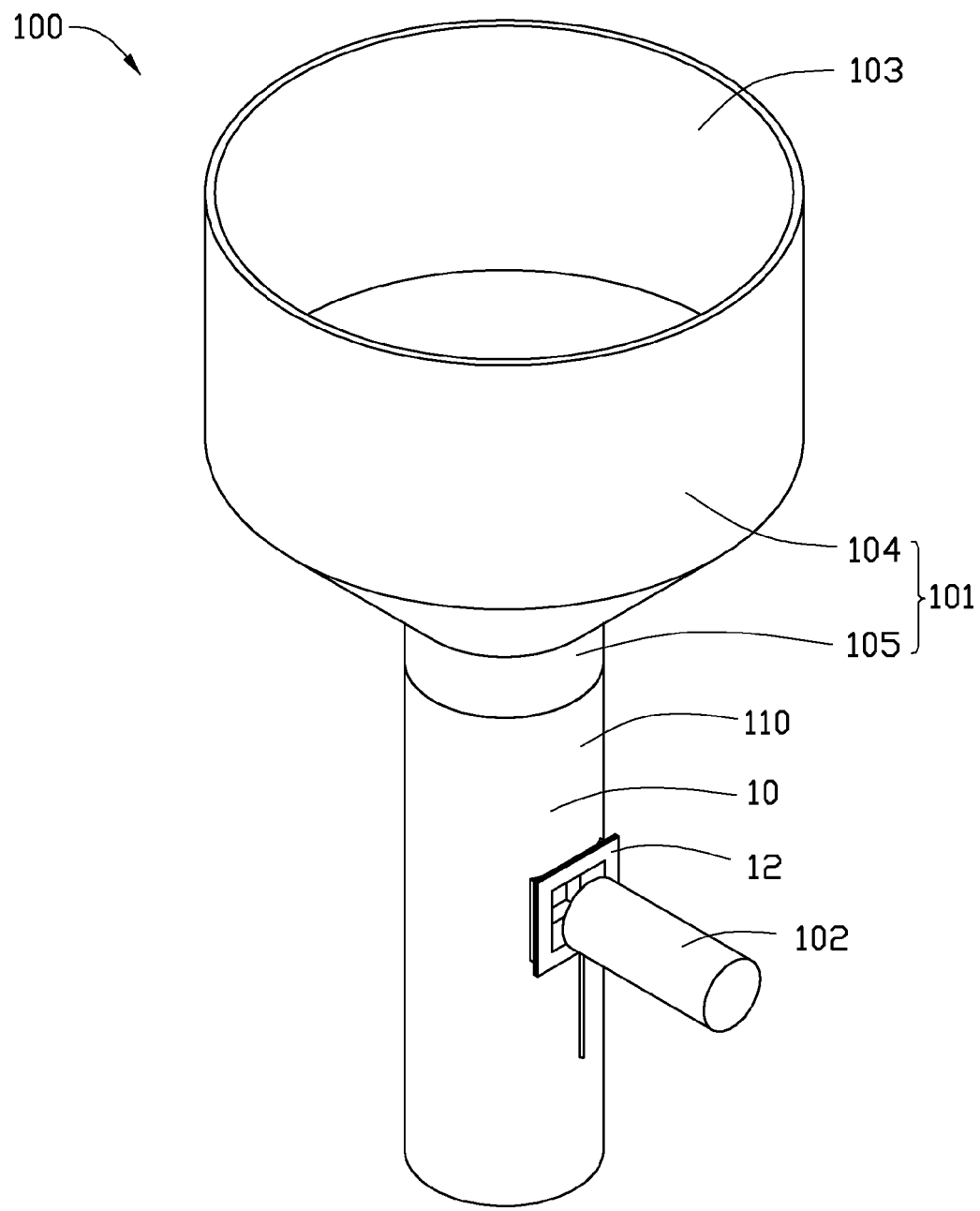
FIG. 4 is an isometric view of a second embodiment of a molding material feeding system using the molding material feeding barrel in FIG. 1.
Figure 5:
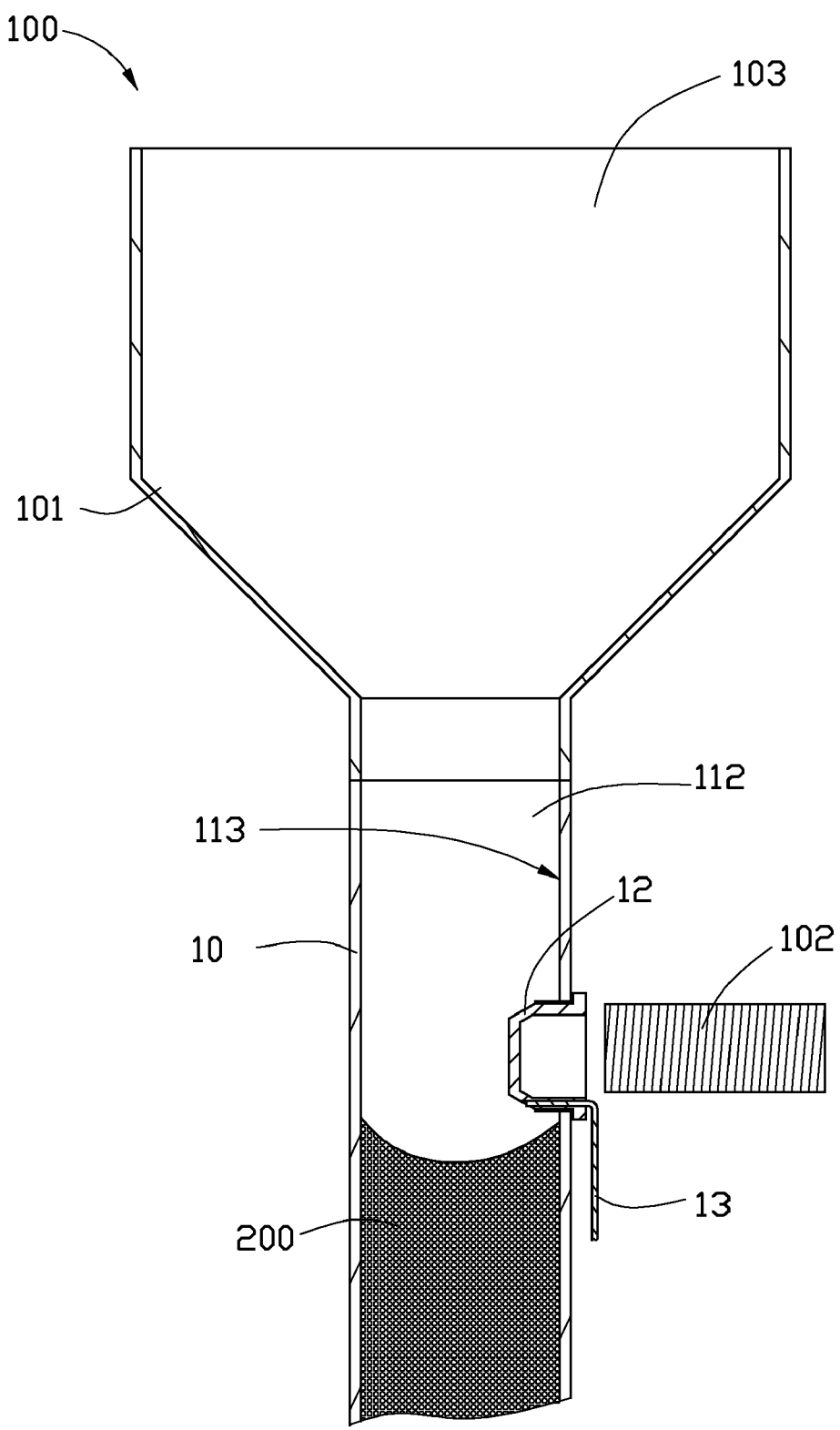
FIG. 5 is a partly exploded, sectional view of the molding material feeding system in FIG. 4.

Referring to FIGS. 4 and 5, a feeding apparatus 100 according to a second embodiment is shown. The feeding apparatus 100 includes a hopper 101, a sensor 102, and the molding material feeding barrel 10.

The hopper 101 defines an accommodating room 103 therein. The accommodating room 103 communicates with the chamber 112 of the molding material feeding barrel 10. The accommodating room 103 is configured for accommodating molding materials 200. The hopper 101 includes a feeding portion 104, and a connecting portion 105. The hopper 101 is funnel-shaped. One end of the connecting portion 105 is connected with one thin distal end of the hopper 101. The opposite distal end of the connecting portion 105 is connected with the top end 110 of the molding material feeding barrel 10. The connecting portion 105 is hollow and communicates with the feeding portion 104 and the chamber 112 of the main body 11.

The sensor 102 is configured for detecting whether materials introduced in the chamber 112 of the molding material feeding barrel 10 reaches a level of the blocking member 12. In the present embodiment, the sensor 102 is an infrared photoelectric sensor. The sensor 102 is positioned outside the molding material feeding barrel 10 and opposite to the blocking member 12. In operation, infrared (IR) light is emitted from the infrared photoelectric sensor 102 and travels through the blocking member 12. Reflected infrared light is different material level in the molding material feeding barrel 10. That is, when the molding material 200 is at a level below the fixing hole 115, the infrared light is reflected by the inner surface 113 of the molding material feeding barrel 10; while when molding material 200 is above or at the predetermined level, the infrared light is reflected by the molding material 200. Thus, the sensor 102 detects the change of reflected infrared light to detect whether the material level in the molding material feeding barrel 10 falls below the fixing hole 115 or not.

As shown in FIG. 5, when material 200 is fed to the feeding apparatus 100 via the accommodating room 103 of the hopper 101, and the chamber 112 of the main body 11, the material 200 may carry static electricity due to friction between the materials or between the materials and the inner surface 113 of the main body 11. The electrically conductive member 13 contacts the material 200 in the chamber 112 such that static electricity of the molding material 200 is conducted to ground. Thus, in the case of the molding material 200 in a level below the fixing hole 112, the molding material 200 will not stick to the inner surface 113 of the molding material feeding barrel 10 and the blocking member 12. Therefore, error conclusions in judgment about whether the molding material 200 is below a predetermined level are avoided.

In the present embodiment, the blocking member 12 protrudes from the inner surface 113 of the main body 11, thereby prevents the molding materials from sticking to the inner surface 113 of the main body 11. In addition, the electrically conductive member 13 can conduct static electricity of the material 200 to the ground. Therefore, less material will stick to the inner surface 113 of the main body 11 and the blocking member 12.

Figure 6:
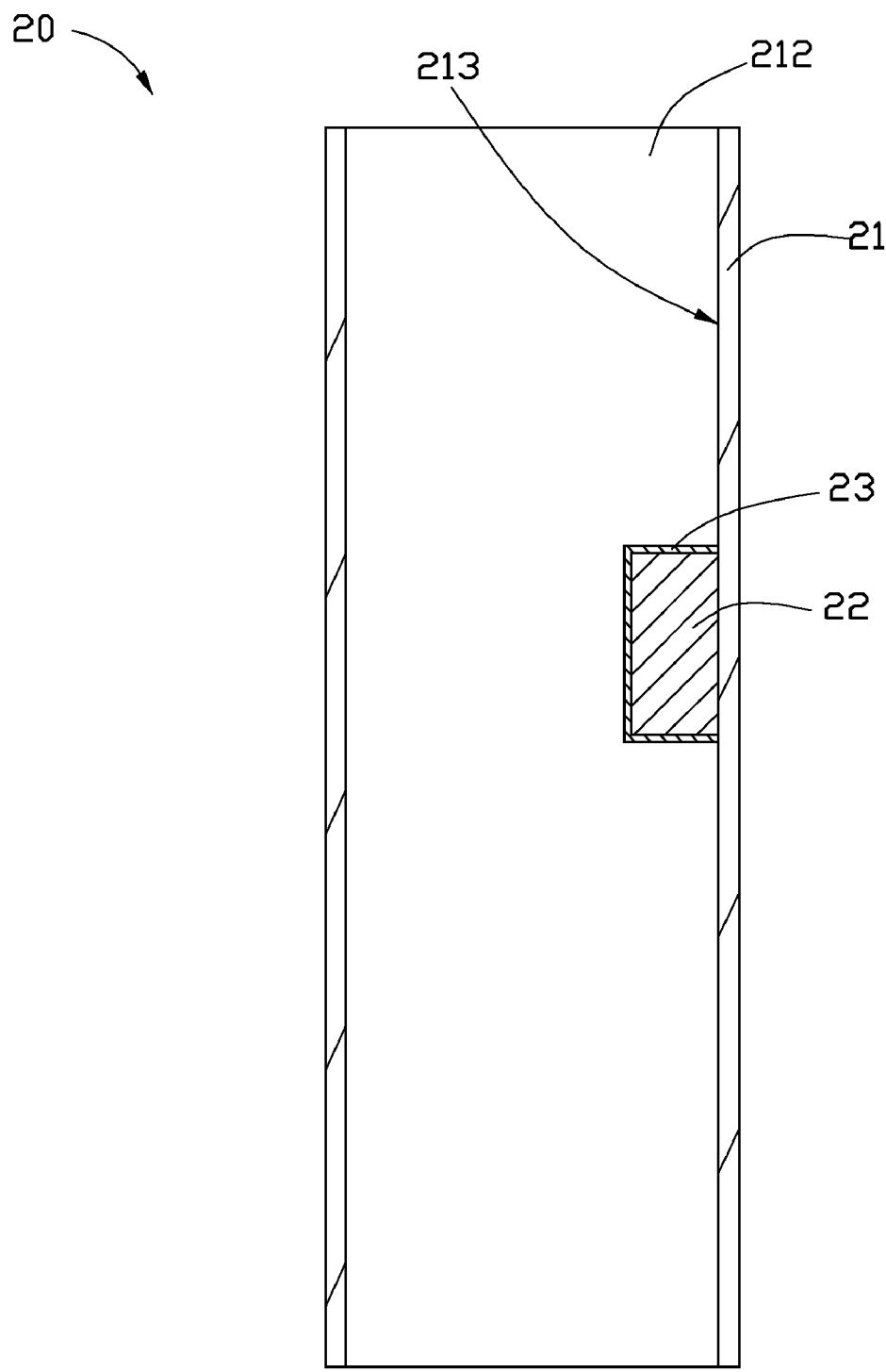
FIG. 6 is a sectional view of a third embodiment of a molding material feeding system.

Referring to FIG. 6, a molding material feeding barrel 20 according to a third embodiment is shown. The molding material feeding barrel 20 is similar to the molding material feeding barrel 10. The molding material feeding barrel 20 differs from the molding material feeding barrel 10 as follows. The blocking member 22 is a solid block. The blocking member 22 is fixed on an inner surface 213 of a main body 21. An electrically conductive film 23 is formed on the blocking member 22, thus exposed at an inside of the main body 11. The electrically conductive film 23 is grounded. In the present embodiment, the blocking member 22 is generally cuboid.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope and spirit of the appended claims.

The invention claimed is:

1. A molding material feeding barrel, comprising:
a main body having a chamber defined therein, the main body having a first inner surface in the chamber;
a blocking member protruding inward from the first inner surface of the main body; and
an electrically conductive member having a first end exposed at an inside of the main body, and a second end grounded.

2. The molding material feeding barrel of claim 1, wherein the main body defines a fixing hole through a sidewall thereof, and the blocking member is coupled to the fixing hole.

3. The molding material feeding barrel of claim 2, further comprising an airtight seal, the main body having a second inner surface in the fixing hole, the airtight seal being loop-shaped and surrounding the blocking member, and the airtight seal hermetically sandwiched between an outer surface of the blocking member and the second inner surface.

4. The molding material feeding barrel of claim 2, wherein the blocking member comprises a loop-shaped side plate, a loop-shaped connection plate, and a top plate, one distal end of the side plate being connected with one distal end of the connection plate, the other end of the connection plate defining an opening, the top plate being connected with the connection plate and covering the opening, the top plate being arranged in the main body, and the blocking member being light-pervious.

5. The molding material feeding barrel of claim 4, wherein the blocking member is comprised of light-pervious glass.

6. The molding material feeding barrel of claim 1, wherein the blocking member is fixed on the first inner surface of the main body.

7. The molding material feeding barrel of claim 1, wherein the main body has a round cross-section, and the blocking member protrudes a distance from the first inner surface in the range from ⅕ to ⅓ of the diameter of the cross-section of the main body.

8. The molding material feeding barrel of claim 1, wherein the electrically conductive member is a conducting wire running through the blocking member, one end of the conducting wire exposed at the inside of the main body, and the end of the conducting wire grounded.

9. The molding material feeding barrel of claim 1, wherein the conductive member is a conductive film coated on an outer surface of the blocking member, and the conductive member is grounded.

10. A molding material feeding system, comprising:
   a mold feeding barrel, comprising:
      a main body having a chamber defined therein, the main body having a first inner surface in the chamber;
      a blocking member protruding inward from the first inner surface of the main body; and
      an electrically conductive member having a first end exposed at an inside of the main body, and a second end grounded;
   a hopper in communication with the chamber of the main body for introducing a molding material into the chamber; and
   a material sensor for sensing whether the molding material introduced in the main body reaches a level of the blocking member.

11. The molding material feeding system of claim 10, wherein the material sensor is an infrared photoelectric sensor.

12. The molding material feeding system of claim 10, wherein the main body defines a fixing hole through a sidewall thereof, and the blocking member is coupled in the fixing hole.

13. The molding material feeding system of claim 12, wherein the molding material feeding barrel further comprises an airtight seal, the main body having a second inner surface in the fixing hole, the airtight seal being loop-shaped and surrounding the blocking member, and the airtight seal hermetically sandwiched between an outer surface of the blocking member and the second inner surface.

14. The molding material feeding system of claim 12, wherein the blocking member comprises a loop-shaped side plate, a loop-shaped connection plate, and a top plate, one distal end of the side plate being connected with one distal end of the connection plate, the other end of the connection plate defining an opening, the top plate being connected with the connection plate and covering the opening, the top plate being arranged in the main body, and the blocking member being light-pervious.

15. The molding material feeding system of claim 10, wherein the blocking member is fixed on the first inner surface of the main body.

16. The molding material feeding system of claim 10, wherein the main body has a round cross-section, and the blocking member protrudes a distance from the first inner surface in the range from ⅕ to ⅓ of the diameter of the cross-section of the main body.

17. A molding material feeding barrel, comprising:
   a main body having a chamber defined therein, the main body having a first inner surface in the chamber;
   a blocking member fixed on an inner surface of the main body; and
   an electrically conductive film formed on the blocking member, the electrically conductive film being grounded.

18. The molding feeding barrel of claim 17, wherein the blocking member is a solid block.

* * * * *